United States Patent
Wienhold et al.

(10) Patent No.: US 6,260,857 B1
(45) Date of Patent: Jul. 17, 2001

(54) QUICK-CHANGE THREE-JAW DRILL CHUCK

(75) Inventors: Thomas J. Wienhold, White Bear Lake, MN (US); James L. Wienhold, 3336 Idaho Ave. South, Minneapolis, MN (US) 55426

(73) Assignee: James L. Wienhold, Minneapolis, MN (US)

( * ) Notice: Subject to any disclaimer, the term of this patent is extended or adjusted under 35 U.S.C. 154(b) by 0 days.

(21) Appl. No.: 09/478,322

(22) Filed: Jan. 6, 2000

Related U.S. Application Data
(60) Provisional application No. 60/114,846, filed on Jan. 6, 1999.

(51) Int. Cl.[7] .................................................. B23B 31/12
(52) U.S. Cl. .............................. 279/62; 279/140; 279/902
(58) Field of Search ................................. 279/60–62, 65, 279/140, 150, 902

(56) References Cited

U.S. PATENT DOCUMENTS

| | | | |
|---|---|---|---|
| Re. 31,755 | 12/1984 | Wanner et al. ........................ | 464/167 |
| 81,260 | 8/1868 | Davis . | |
| 1,602,708 | 10/1926 | Russell . | |
| 2,350,565 | 6/1944 | Mills ..................................... | 279/76 |
| 2,370,487 | 2/1945 | Poutie .................................... | 279/42 |
| 2,736,562 | 2/1956 | Blackburn ............................. | 279/76 |
| 2,767,992 | 10/1956 | Emrick ................................... | 279/82 |
| 2,807,473 | 9/1957 | Kiehne ................................... | 279/82 |
| 2,926,020 | 2/1960 | Dayton et al. ......................... | 279/75 |
| 3,255,792 | 6/1966 | Beck ...................................... | 145/64 |
| 3,367,727 | 2/1968 | Ward et al. ............................. | 306/28 |
| 3,583,715 | 6/1971 | Jahrl ....................................... | 279/75 |
| 3,945,653 | 3/1976 | Falchle .................................... | 279/97 |
| 4,209,182 | 6/1980 | Sheldon ................................... | 279/75 |
| 4,290,617 | 9/1981 | Yoshida ................................... | 279/75 |
| 4,381,116 | * 4/1983 | Futter ..................................... | 279/62 |
| 4,434,859 | 3/1984 | Rumpp et al. ......................... | 173/48 |
| 4,577,875 | 3/1986 | Miyakawa .............................. | 279/75 |
| 4,594,036 | 6/1986 | Hogenhout ............................ | 408/240 |
| 4,629,375 | 12/1986 | Lieser ..................................... | 408/239 |
| 4,692,073 | 9/1987 | Martindell ............................. | 408/239 |
| 4,900,202 | 2/1990 | Wienhold .............................. | 408/240 |
| 5,013,194 | 5/1991 | Wienhold .............................. | 408/240 |
| 5,417,527 | 5/1995 | Wienhold .............................. | 408/239 |
| 6,135,462 | * 10/2000 | Robison ................................ | 279/62 |

\* cited by examiner

*Primary Examiner*—Steven C. Bishop
(74) *Attorney, Agent, or Firm*—Kinney & Lange, P.A.

(57) ABSTRACT

A quick-change chuck for a tool bit mounted to a drive shaft. The chuck includes a spindle with a tool end and a hub end where a bore extends into the hub end from a forward face. The bore has an inner end for receiving a tool bit. A sleeve is disposed around and rotatably connected to the hub end. The sleeve has a spindle side wall and an outer side wall. An air gap exists between the sleeve and the thrust washer on the spindle. Adjustable jaws protrude through the spindle into the bore at an acute angle and define an opening between the jaws. The jaws threadably engage the sleeve so that rotating the sleeve about the hub causes the adjustable jaws to move axially between an open position and a closed position. The open position occurs when the jaws are retracted from the bore and the closed position occurs when the jaws are extended into the bore. An bias member urges the jaws towards a closed position, and maintains the air gap between the thrust washer and the sleeve. Overcoming the spring force of the elastic member allows transferal of force from the jaws to the spindle.

20 Claims, 13 Drawing Sheets

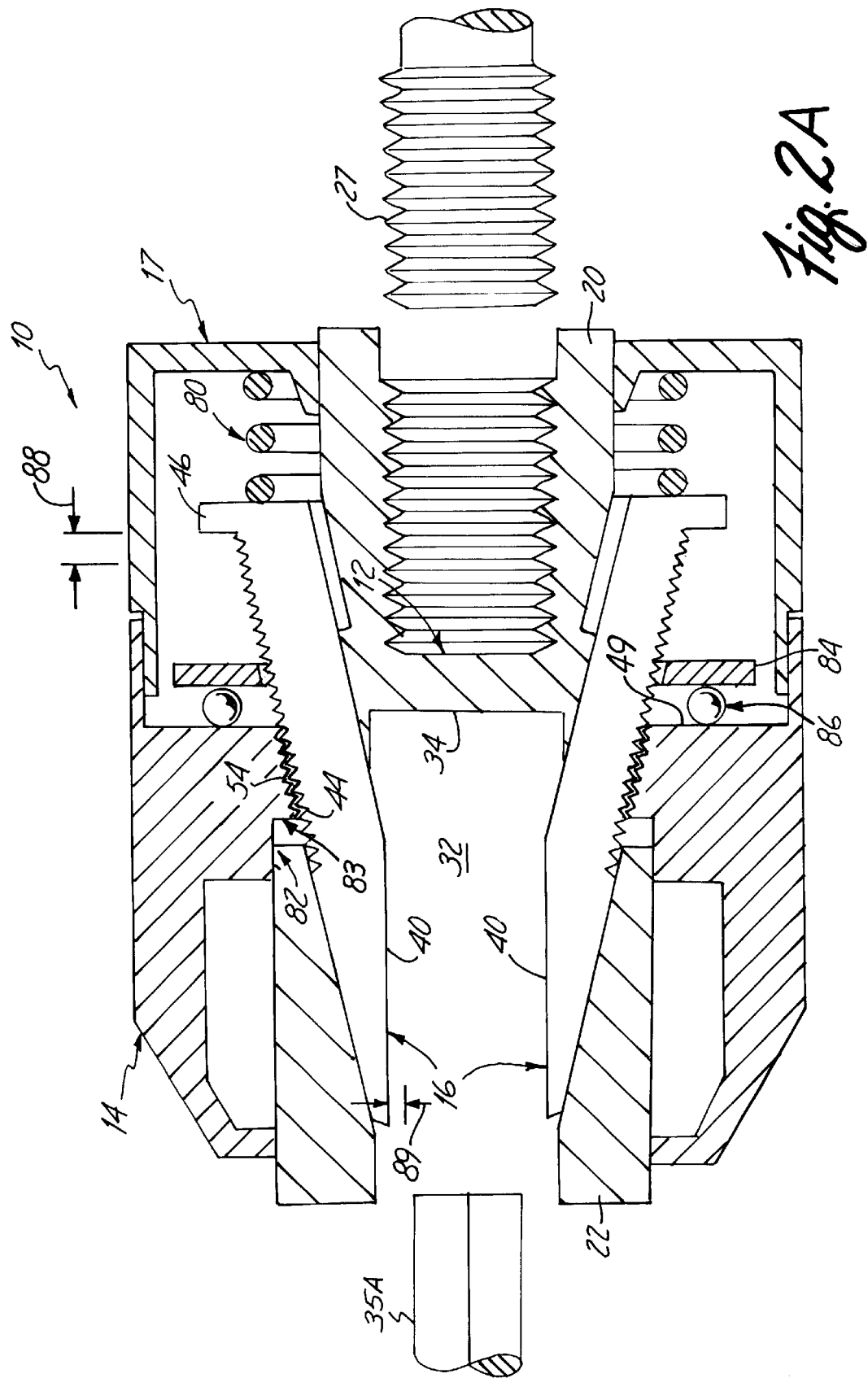

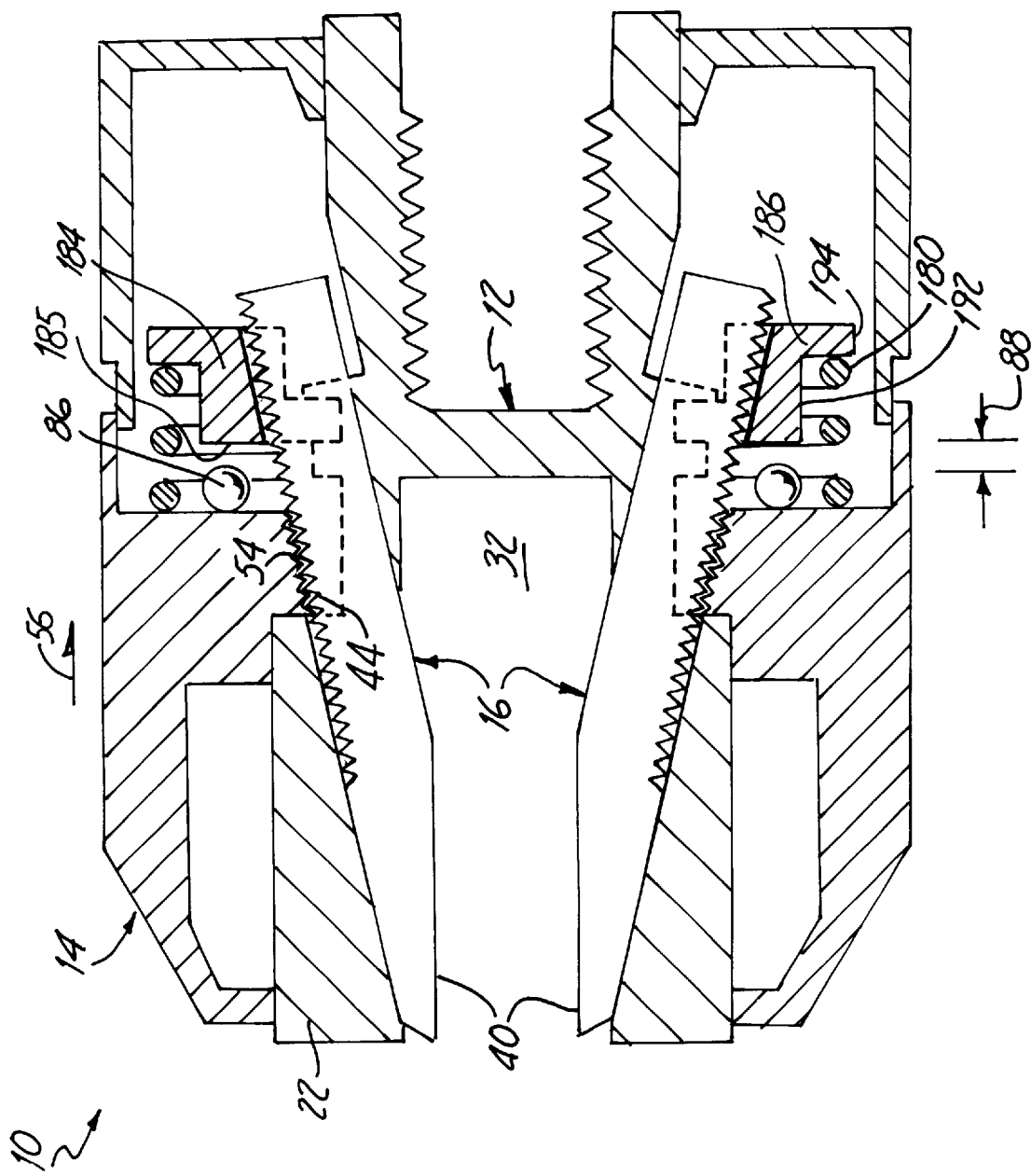

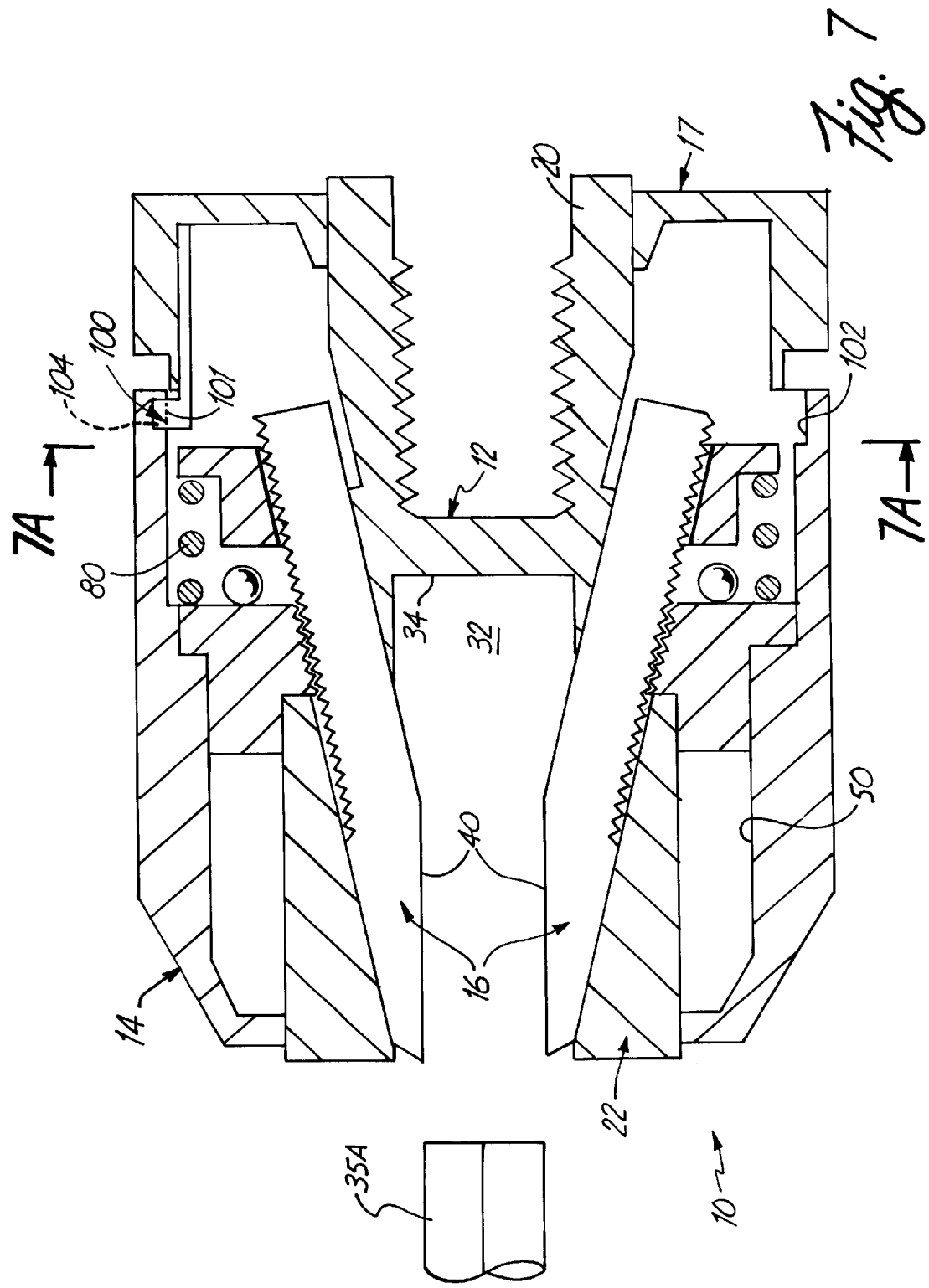

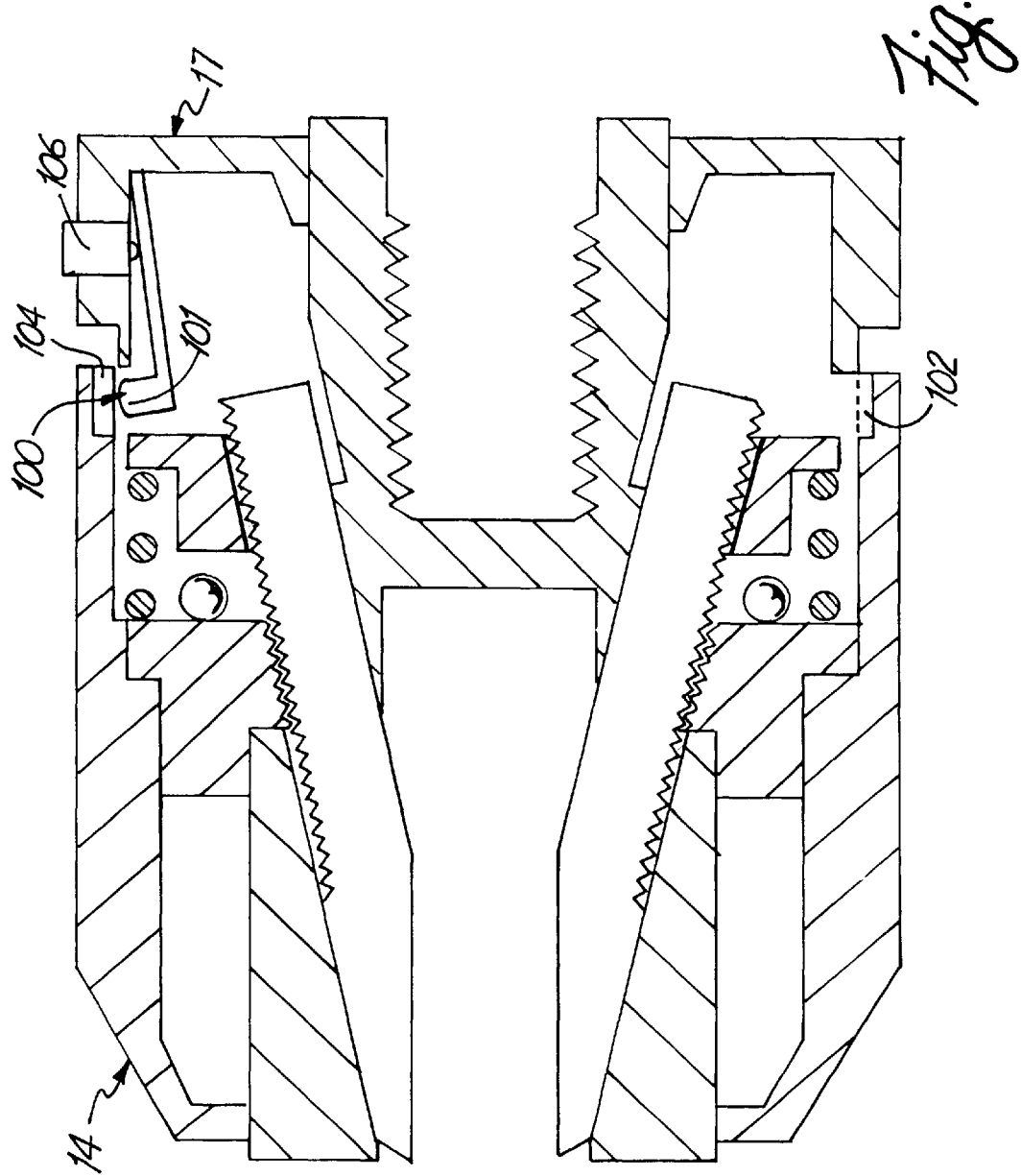
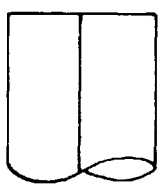
Fig. 7B

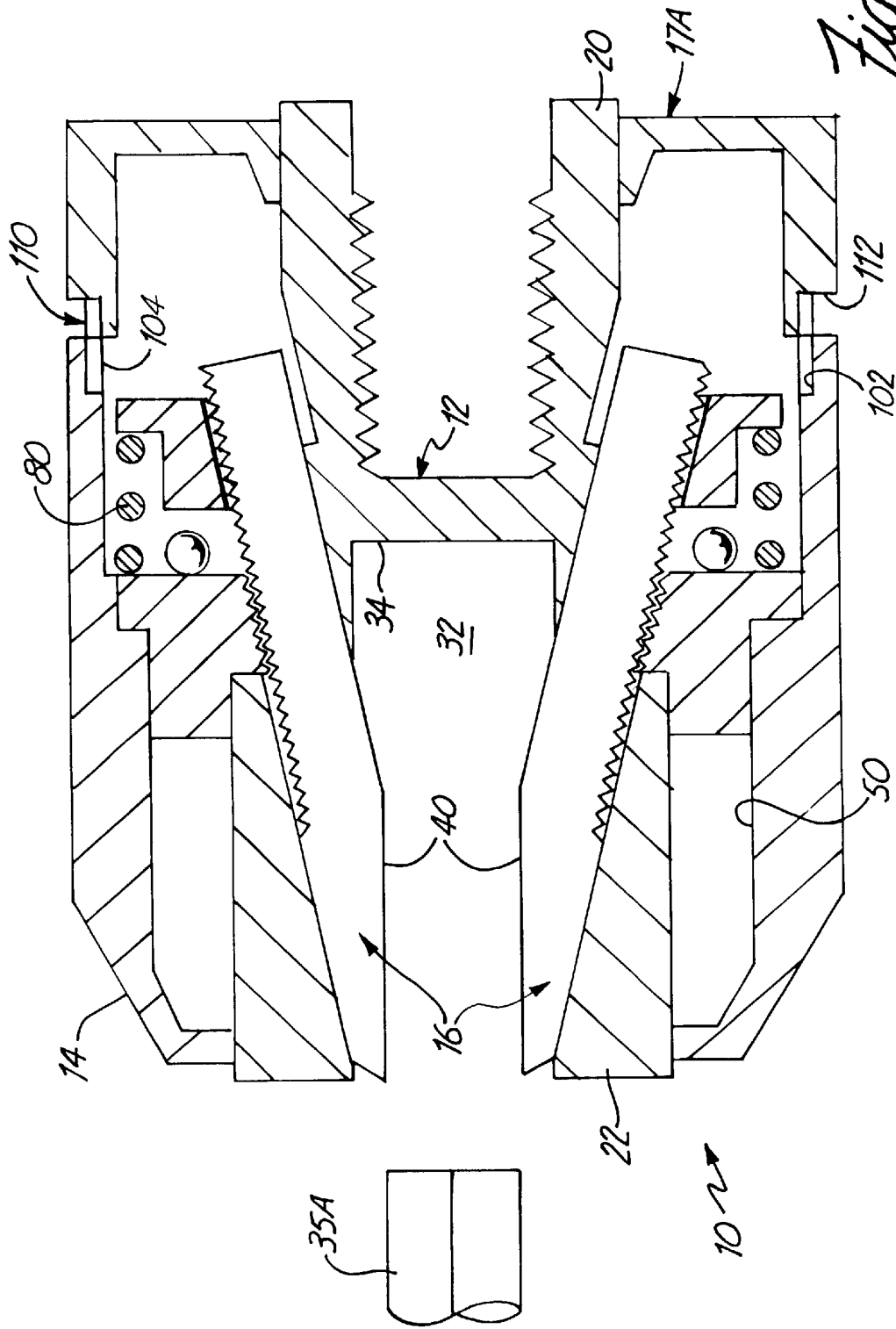

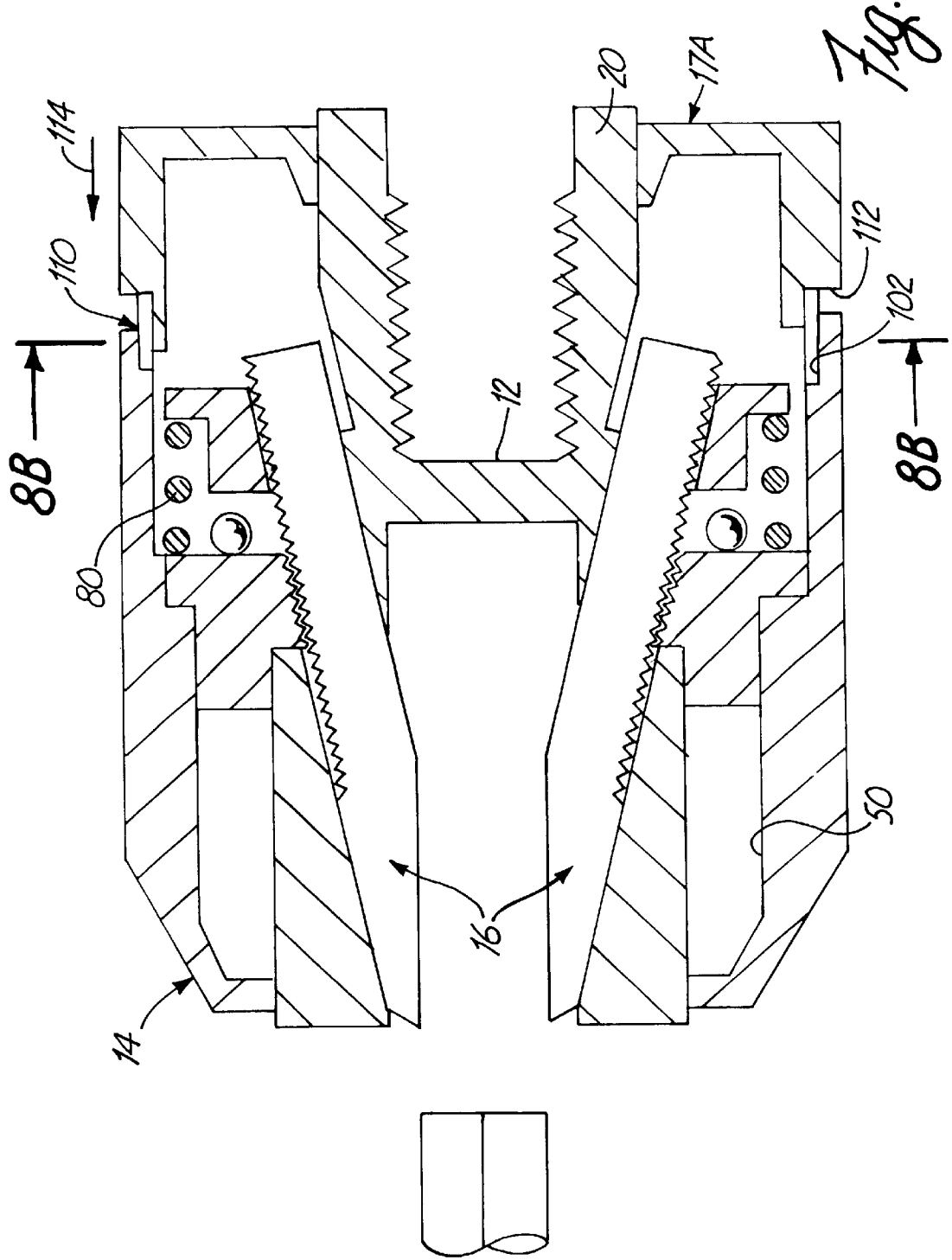

QUICK-CHANGE THREE-JAW DRILL CHUCK

CROSS-REFERENCE TO RELATED APPLICATION(S)

The application claims priority from U.S. Provisional Application Ser. No. 60/114,846 filed Jan. 6, 1999 for "Quick-Change Three-Jaw Drill Chuck" by Thomas J. Wienhold and James L. Wienhold.

BACKGROUND OF THE INVENTION

The marketplace currently offers two primary types of drill chuck mechanisms for retaining drilling and driving tool bits. The traditional or "incremental" design typically consists of a mechanism that houses three adjustable jaws which protrude at an angle into a bore. An external sleeve is coupled to the jaws via internal gear teeth. When a tool is inserted into the bore, the sleeve is rotated by a user. As the sleeve is rotated in one direction, the jaws are forced towards the center of the bore to clamp a tool bit. When the sleeve is rotated in the opposite direction, the jaws are opened. This chuck style is able to accommodate a variety of tool sizes and shapes, however, changing a tool bit takes time.

It has long been recognized that the ability to quickly change tool bits in the spindle of a power tool is an advantageous feature. Construction workers and carpenters regularly change drill bits in numerous types of construction projects, often when the worker is in a position where it is difficult to change the bit, such as on a ladder. To change a drill bit, the carpenter must loosen the chuck, remove the old bit from the chuck, insert the new bit and tighten the chuck.

A second, more recent approach to chuck design allows for tools to be exchanged in a "quick-change" manner. Examples of quick-change mechanisms such as this are explained in U.S. Pat. Nos. 4,900,202 and 5,013,194, both of which are incorporated by reference herein. Quick-change chucks typically require the use of tools that have shanks that are of a consistent size (typically, ¼" hex shank), and usually have hexagonal cross sections. This style of chuck does not allow for accommodating a variety of tool shank sizes.

The traditional three-jaw approach accommodates tools with round shanks and a range of different diameters and the more recent "quick-change" chucks allow for switching bits in a timely manner. None of the designs for chucks, however, combine these two features and accommodate the "quick change" style tool shanks as well as the flexibility of accommodating variable shank sizes using an "incremental" approach.

BRIEF SUMMARY OF THE INVENTION

The present invention relates to a chuck for a tool bit which is mounted to a drive shaft of a rotational driving tool. The chuck comprises a spindle with a power end and a hub end. A forward face is disposed on the hub end and a bore extends into the hub end from the forward face. The bore has an inner end for receiving a shank of the tool bit. An annular thrust washer is fixed to the spindle. A sleeve is disposed around and rotatably connected to the hub end of the spindle. The sleeve has a spindle side wall and an outer side wall, with a space defined between the sleeve and the thrust washer. Adjustable jaws protrude through aligned holes in the spindle and into the bore at an acute angle, with an opening defined between the jaws. The jaws threadably engage the sleeve, so that rotating the sleeve about the hub causes the adjustable jaws to translate between an open position and a closed position. The open position occurs when the jaws are radially retracted from the bore and the closed position occurs when the jaws are radially extended into the bore. An elastic member is coupled to the sleeve to bias the jaws towards a closed position and maintain the space between the thrust washer and the sleeve. Overcoming the bias force of the elastic member eliminates the space between the thrust washer and the sleeve.

BRIEF DESCRIPTION OF THE DRAWINGS

In this disclosure, several chuck mechanisms are illustrated. Throughout the drawings, like reference numerals are used to indicate common features or components of those devices.

FIG. 2A shows a cross sectional side view of the first embodiment of the chuck mechanism in the quick change retracted mode.

FIG. 6 shows a cross sectional side view of a second embodiment of the inventive chuck mechanism.

FIG. 7 shows a cross-sectional side view of a third embodiment of the invention using a pawl to lock the sleeve in place.

FIG. 7B shows a cross-sectional side view of a fourth embodiment of the inventive chuck mechanism (the embodiment of FIG. 7 with the addition of a pawl release button).

FIG. 8 shows a cross-sectional side view of a fifth embodiment of the inventive chuck, utilizing a slidable shroud in the rearward position.

FIG. 8A shows a cross-sectional side view of the fifth embodiment shown in FIG. 8, with the shroud in the forward position.

While the above-identified drawing figures set forth several preferred embodiments of the invention, other embodiments are also contemplated, as noted in the discussion. In all cases, this disclosure presents the invention by way of representation and not limitation. It should be understood that numerous other modifications and embodiments can be devised by those skilled in the art which fall within the scope and spirit of the principle of the invention.

DETAILED DESCRIPTION

Figure 1:
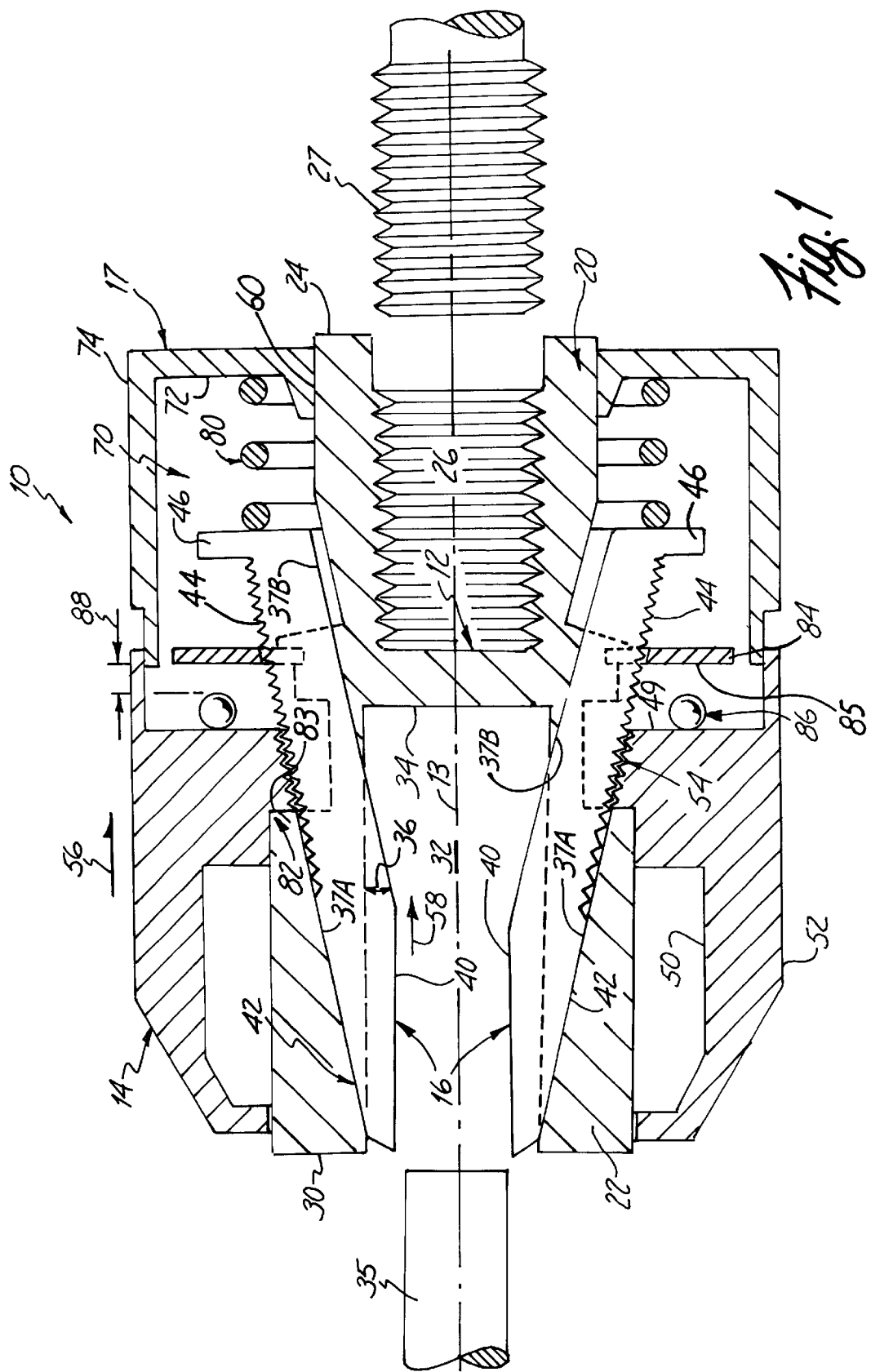
FIG. 1 shows a cross sectional side view of a first embodiment of the chuck mechanism in unloaded mode.

The present invention is a quick-change chuck for a tool bit indicated generally at 10 in FIG. 1. The chuck includes a spindle 12 having a central axis 13, a sleeve 14, adjustable jaws 16 and a shroud 17. The spindle 12 includes a power end 20 and a hub end 22. The power end 20 of the spindle 12 has a rear face 24. A drive shaft bore 26 extends into the rear face 24 towards the hub end 22. The drive shaft bore 26 is typically threaded so as to receive a drive shaft 27 from a tool (e.g., a drill). A forward face 30 is disposed on the hub end 22 of the spindle 12. A tool bore 32 extends into the hub end 22 from the forward face 30. The tool bore 32 terminates at an inner face 34 which receives the shank of a tool bit (e.g., a drill bit), illustrated as a standard tool bit 35. FIG. 1 shows the inventive chuck 10 in "unloaded mode", meaning the tool bit 35 has not been inserted into the chuck 10.

Adjustable jaws 16 extend through the spindle 12 into the tool bore 32 at an acute angle so that the adjustable jaws 16 are extending substantially parallel to the tool bore 32. The tool chuck 10 utilizes a mounting angle 36 of fifteen degrees. The mounting angle 36 is the angle (relative to the spindle axis) at which the jaws 16 extend through the spindle 12 into the tool bore 32. The preferred embodiment of the invention uses fifteen degrees since this mounting angle 36 is used in traditional designs of tool chucks, however, a person skilled in the art would realize that other angles may be used. The angle 36 at which each jaw 16 extends into the bore 32 is defined by an opening in the spindle 12 illustrated in FIG. 1 by spindle faces 37A and 37B. The spindle faces 37A and 37B guide each jaw 16 through the spindle 12 and into the bore 32, and also serve to provide support to the jaws 16. This method of positioning and guiding the jaws 16 in a chuck are known in the art.

Each adjustable jaw 16 includes a jaw face 40 and an opposed sleeve face 42. The sleeve face 42 of the adjustable jaw 16 includes a gear rack 44. A radially projecting foot 46 is disposed on each jaw 16 proximate to the power end 20 of the spindle 12.

The sleeve 14 encompasses the hub end 22 of the spindle 12. The sleeve 14 includes a limit surface or thrust side 49, a jaw side 50 and an outer side 52. The thrust side 49 extends radially from the spindle 12 and is disposed towards the power end 20. The jaw side 50 of the sleeve 14 has an annular shape and includes an annular sleeve gear 54. The sleeve gear 54 threadably engages the gear rack 44 of each adjustable jaw 16 so that when the sleeve 14 is rotated about the spindle 12 the gear teeth of the sleeve gear 54 engage the gear teeth of the gear rack 44 to force the jaws to close (if the sleeve 14 is rotated in one direction) or open (if the sleeve 14 is rotated in the opposite direction). The adjustable jaws 16 close, or come radially together, when the jaws 16 are moved towards the hub end 22 of the spindle 12. In order for the chuck 10 to hold the tool bit 35, the bit 35 is placed in the tool bore 32, between the jaws 16. The sleeve 14 is rotated and the cooperative threaded engagement of the sleeve gear 54 and the gear racks 44 force the jaw faces 40 of the jaws 16 towards the center of the tool bore 32. When the jaws 16 are moved toward the forward face 30 of the spindle 12, they are forced to close on the bit 35, clamping the bit 35 inside the chuck 10. Opening the adjustable jaws 16 occurs when the jaws 16 are moved toward the power end 20 of the spindle 12, retracting the jaws 16 from the center of the tool bore 32. Operating the chuck 10 in this fashion is the "incremental" mode of securing the bit 35 into the chuck 10.

An alternate method of securing the bit 35, the "quick-change" mode, is by sliding the sleeve 14 longitudinally (see FIG. 1, arrow 56) axially along the spindle 12. Since the sleeve 14 and the jaws 16 engage at the sleeve gear 54 and gear rack 44 inner face, the adjustable jaws 16 are thus also moved in an axial direction (see arrow 58). Sliding the sleeve 14 towards the power end 20 of the spindle 12, retracts the adjustable jaws 16 radially out of the tool bore 32. Moving the sleeve 14 in the opposite direction (towards the hub end 22 of the spindle 12) extends the adjustable jaws 16 radially into the tool bore 32. Space (or "play") is allowed between the teeth of the sleeve gear 54 and of the gear rack 44 so that radial movement of the jaws will not cause undue radial force on the sleeve 14. This "play" also prevents binding between the sleeve gear 54 and the gear rack 44. The ability to slide the sleeve 14 in this fashion allows the user of the chuck 10 to quickly increase the spacing between the jaw faces 40 at the jaws 16, thereby applying or removing the clamping pressure created by the jaws 16 with respect to the tool bit 35.

In either the "incremental" or the "quick-change" mode, once the bit 35 is secured inside the chuck 10, the user can operate the tool, causing the drive shaft 27, chuck 10, and tool bit 35 to rotate. Additionally, the jaw faces 40 of each jaw 16 may additionally have surface texture, or a series of small barbs or steps to further enhance the gripping capability of the jaws 16 relative to the tool bit 35.

The shroud 17 is disposed annularly around the power end 20 of the spindle 12 and is fixably mounted to the spindle 12 at annular interface 60. The shroud 17 is affixed to the spindle 12 so as to create a cavity 70 between the shroud 17 and the spindle 12. The shroud 17 has an internal side 72 and an external side 74.

A compression spring 80 is axially disposed in the cavity 70 created by the shroud 17. The spring 80 is mounted between the foot 46 of each of the adjustable jaws 16 and the internal side 72 of the shroud 17. Although this embodiment shows the spring 80 mounted between the shroud 17 and the feet 46, other mounting positions may also be used (as further discussed, for example, with respect to FIG. 6). Spring 80 urges the jaws 16 axially toward the hub end 22 of the spindle 12 and into the tool bore 32, and also forces the sleeve 14 towards the hub end 22 (the clamping position) of the spindle 12.

An annular shoulder 82 is disposed on the spindle 12 proximate to where the sleeve gear 54 engages the gear rack 44, opposite an annular face 83 (FIG. 2) on the sleeve 14. It should be noted that although the shoulder 82 is shown in the preferred embodiment as positioned approximately midway along the longitudinal length of the chuck 10, a person skilled in the art would realize it could be placed anywhere along the length of the interface between the spindle 12 and the sleeve 14.

When the sleeve 14 is urged axially towards the hub end 22 of the spindle 12, it is limited in the longitudinal distance it may travel by engagement of its face 83 with the shoulder 82. When sleeve 14 is urged towards the power end 20 of the spindle 12 (in the direction of arrow 56) the traveling distance is limited by an annular thrust washer 84. The annular thrust washer 84 projects axially from spindle 12, and may be mounted on the spindle 12 or integrally formed thereon. The washer 84 extends proximate to the thrust side 49 of the sleeve 14, into the cavity 70 created by the shroud 17, and has a limit surface 85 spaced from and opposing the thrust side 49 of the sleeve 14. An annular thrust bearing 86 (e.g. an annular ball bearing race) is disposed between the thrust washer 84 and the thrust side 49 of the sleeve 14. Typically, the thrust bearing 86 utilizes a bearing race (as known in the art) press fit into the spindle, although a person skilled in the art would realize alternate bearing means can be used.

In quick-change mode, when the user urges the sleeve 14 towards the power end 20 of the spindle 12, the thrust bearing 86 moves an axial (or longitudinal) travel distance 88 (FIG. 1) of approximately 0.020 inches and comes in contact with the thrust washer 84. Since the thrust washer 84 is fixedly attached to the spindle 12 the sleeve 14 can only be moved axially the distance between the thrust bearing 86 and the thrust washer 84. The result is that the jaws 16 travel the same axial distance (0.020 inches) as the sleeve 14. As illustrated, the jaws 16 typically extend through the thrust bearing 86. Due to the mounting angle 36 and thread play, while the jaws move axially, the jaws 16 are also retracted from the tool bore 32 a radial distance 89 (FIG. 2A) of approximately 0.009 inches. Although the nominal axial travel distance 88 is approximately 0.020 inches, the travel distance 88 (FIG. 1) can vary from approximately 0.005 inches to approximately 0.060 inches. If less than 0.005 inches is allowed for the axial travel distance 88, the jaws 16 will not radially retract sufficiently to allow quick-change bits to be inserted or removed. Additionally, typically if more than 0.060 inches is allowed for the axial travel distance 88, too much thread pay is required between the sleeve gear 54 and the gear rack 44. In an alternate embodiment of the invention which uses a different jaw angle (other than 15 degrees), the ratio of longitudinal movement to radial movement may vary.

Alternatively, in the incremental mode, if the user rotates the sleeve 14 about the spindle 12, the engagement of the sleeve gear 54 with the gear rack 44 forces the jaws closed until the bit 35 is clamped between the faces 40 of the jaws 16. Continuing to rotate the sleeve 14 attempts to force the jaws 16 further into the tool bore 32. Since the jaws 16 are unable to extend into the bore 32 due to the presence of the tool bit 35, sleeve 14 is urged axially towards the power end 20 until the thrust bearing 86 comes in contact with the thrust washer 84 (see FIG. 4). The threaded engagement between the gear rack 44 and the sleeve gear 54 acts to translate the sleeve 14 towards the power end 20. Thus, it is the combination of the force of spring 80 and the travel distance 88 (or "end play") between the thrust bearing 86 and the thrust washer 8 which allows the chuck 10 to be operated in either the incremental or the quick-change mode.

Figure 2:
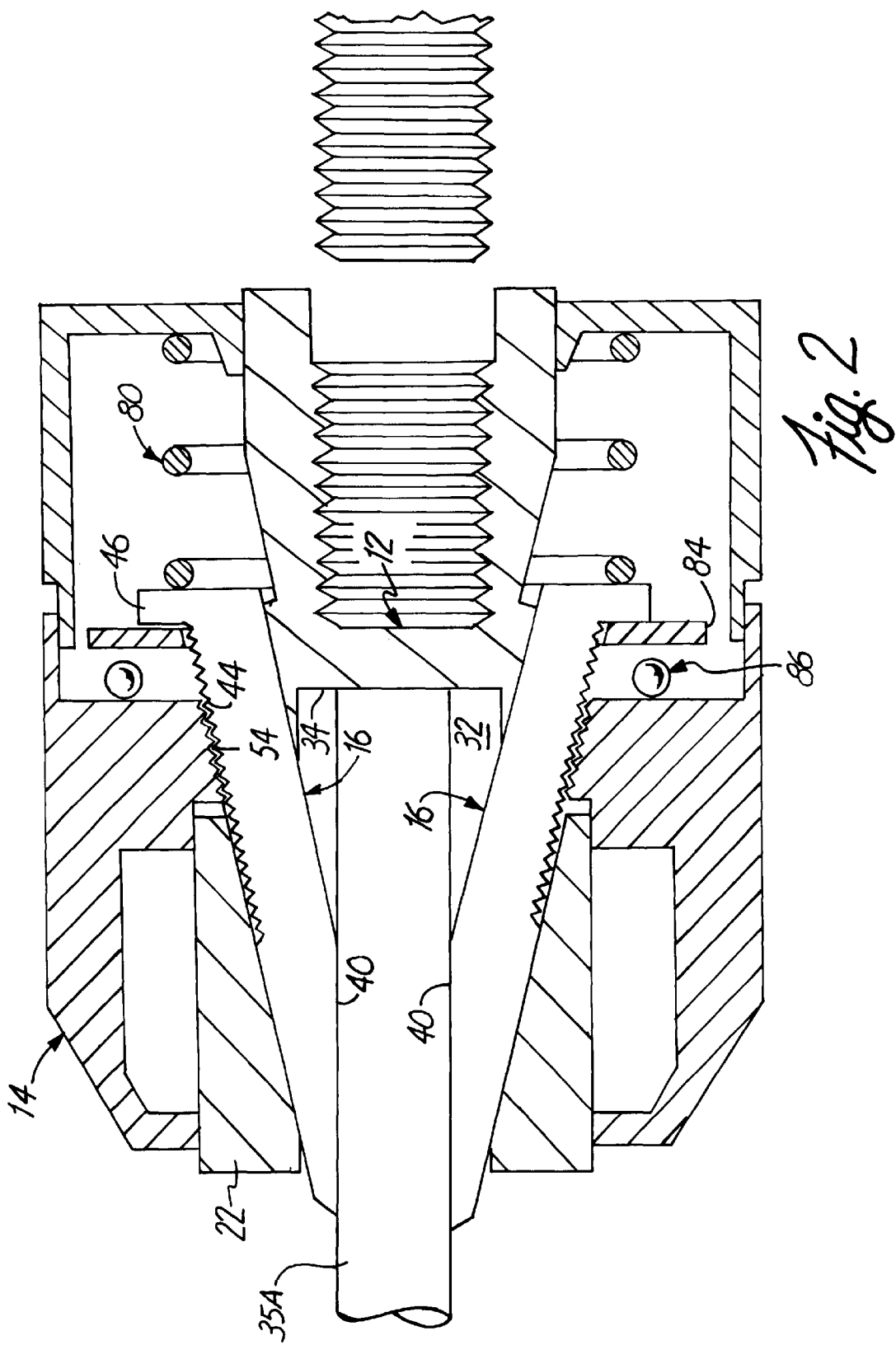
FIG. 2 shows a cross sectional side view of the first embodiment of the chuck mechanism in the quick change loaded mode

FIG. 2 shows the chuck 10 in the quick change "loaded" mode. A quick change tool bit 35A (known in the art), typically having flats on its shaft (typically with a hexagonal cross-section) is inserted into the bore 32. As the tool bit 35A is pushed into the bore 32, it frictionally engages the faces 40 of the jaws 16 and forces the jaws 16 rearwardly (towards the power end 20 of the spindle 12). As the jaws 16 move rearwardly, they also retract radially outwardly from the tool bore 32. The jaws 16 retract sufficiently to allow passage of the tool bit 35A between the jaw faces 40, so that the tool bit 35A can slide completely into the bore 32 until it reaches the inner face 34 of the bore 32. The spring 80 is slightly compressed by the forced rearward movement of the jaws 16. Thus, the jaws 16 clamp the tool bit 35A in place due to the force of the spring 80. If the tool bit 35A is urged out of the bore 32 (i.e. by gravity) towards the hub end 22 of the spindle 12, the jaws 16 are urged towards the hub end 22 of the spindle 12 as well. The jaws 16 are moved due to the forward bias of the jaws 16 along with frictional interference between the jaw faces 40 and the tool bit 35A. Since urging the jaws 16 forwardly (towards the hub end 22) also urges them inwardly into the bore 32, clamping pressure on the tool bit 35A is increased, preventing the release of the tool bit 35A from the chuck 10.

To release the quick release tool bit 35A from the chuck 10, the operator slides the sleeve 14 (and the connected jaws 16) rearwardly, as shown in FIG. 2A (which shows the chuck 10 in the "retracted" quick change mode). In this mode, the jaws 16 are radially retracted by the operator using the sleeve 14 (by pushing the sleeve 14 to the right). As illustrated, the thrust bearing 86 has been urged towards the power end 20 of the spindle 12 so that it is in contact with the thrust washer 84. The contact between the bearing 86 and the washer 84 will not allow the sleeve 14 to be urged any further towards the power end 20. The threaded interface between the sleeve 14 and the adjustable jaws 16 at the sleeve gear 54 and the gear rack 44 translates the movement of the axial sleeve 14 into axial movement of the adjustable jaws 16. The adjustable jaws 16 are urged along the longitudinal axis of the chuck 10, parallel to the tool bore 32, towards the power end 20 of the spindle 12. Additionally, the distance between the jaws 16 is increased radially due to thread play, as they are retracted from the tool bore 32 through the spindle 12. The spring 80 is compressed approximately 0.020 inches (the same amount as the travel distance 88). The ratio of longitudinal movement to radial movement of the jaws 16 is preferably approximately 2.2/1 for jaws extending at fifteen degrees in the bore 32. Thus, when the axial end play 88 is approximately 0.020 inches, the jaws 16 radially retract preferably approximately 0.009 inches, illustrated at 89. The face 83 of the sleeve 14 is pulled away from the shoulder 82 of the spindle 12. The spring 80 is compressed by the movement of the foot 46 towards the shroud 17. The increased radial distance between the faces 40 of the adjustable jaws 16 allows for the quick-change tool bit 35A to be withdrawn (or alternatively inserted) from between the jaws 16 without rotating the sleeve 14.

Figure 3:
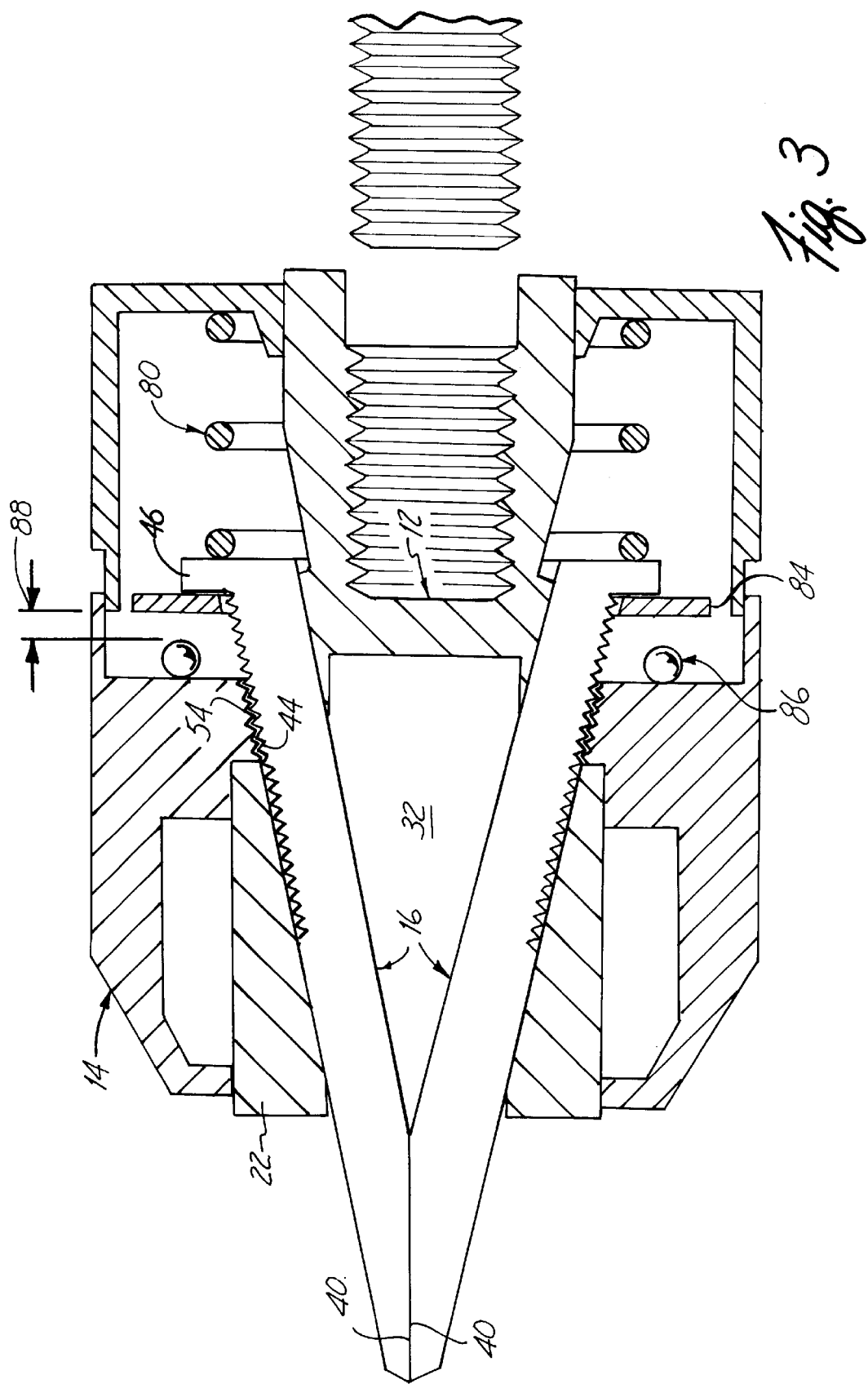
FIG. 3 shows a cross sectional side view of the first embodiment of the invention with jaws fully extended.

Using the chuck 10 in the incremental mode is illustrated in FIG. 3 which shows the inventive chuck 10 with the jaws 16 extending the maximum distance radially into the tool bore 32. The chuck 10 is shown in this configuration to better illustrate the operation of the chuck 10. Use of the chuck 10 in incremental mode with a standard bit inserted into the bore 32 is discussed with respect to FIG. 4. The chuck 10 is put in the fully closed position by rotating the sleeve 14 about the spindle 12. Rotating the sleeve 14 causes the gear rack 44 to move along the sleeve gear 54 on each respective jaw 16. Rotating the sleeve 14 in one direction (i.e., clockwise) moves the jaws 16 longitudinally towards the hub end 22 of the spindle 12 and moves the jaws 16 radially towards each other until the jaw faces 40 engage each other, constituting one end of the range of motion of the jaws 16 into the tool bore 32. The force from the spring 80 maintains the sleeve 14 biased towards the hub end 22 of the spindle 12 and the travel distance 88 remains between the thrust bearing 86 and the thrust washer 84. When the user continues to rotate the sleeve 14 about the spindle 12, the engagement of the jaw faces 40 prevents the jaws 16 from moving radially further into the tool bore 32 and longitudinally toward the hub end 22. The forces generated by continued rotation of the sleeve 14 moves the sleeve 14 longitudinally towards the power end 20, until the thrust bearing 86 engages the thrust washer 84, thereby moving the sleeve 14 the travel distance 88 and overcoming the "end play" allowed by the spring 80.

Figure 3A:
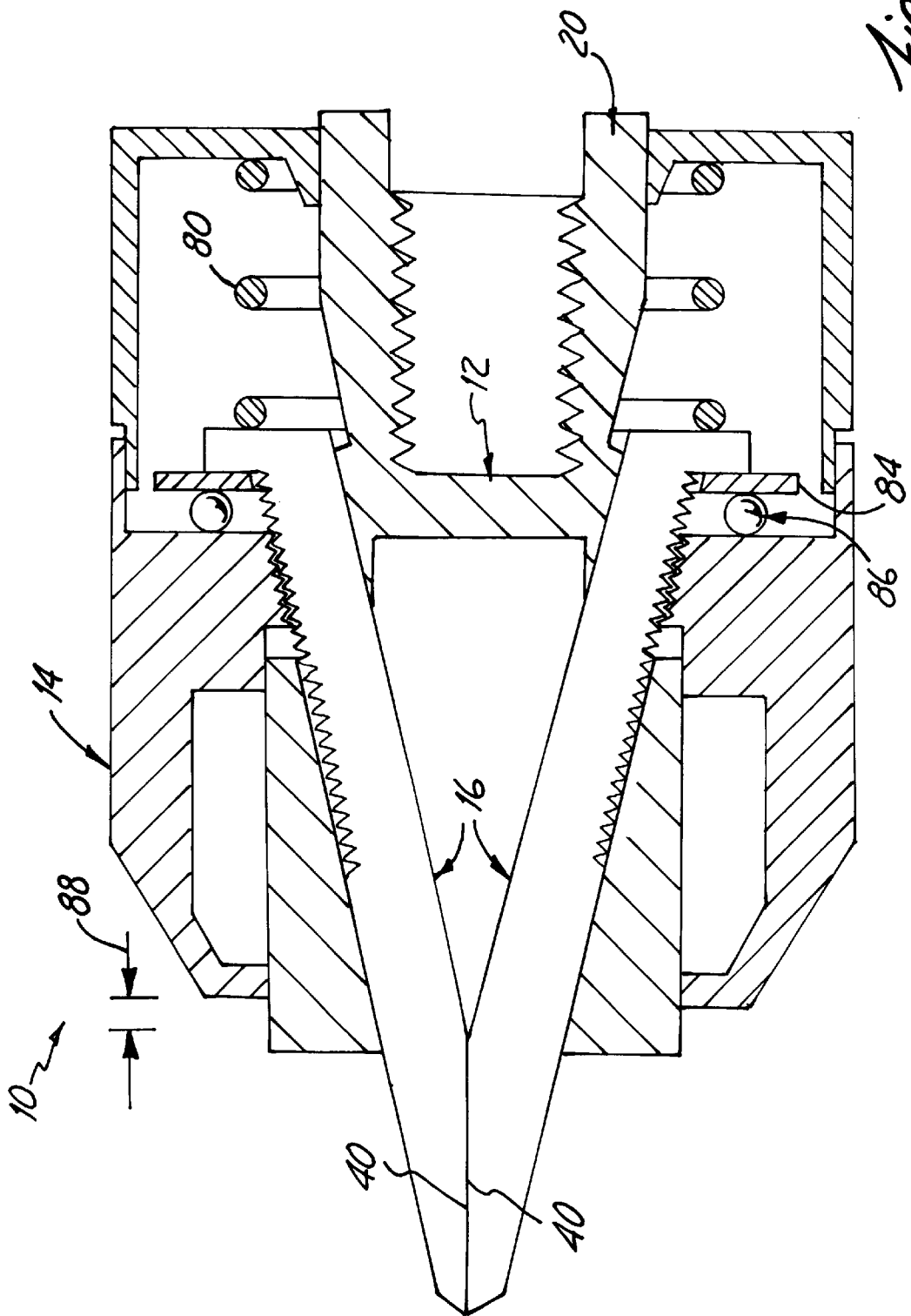
FIG. 3A shows a cross sectional side view of the first embodiment of the invention with the jaws fully extended in the "over-tightened" position.

The tool chuck 10 is shown in this clamped state in FIG. 3A. Thrust bearing 86 abuts the thrust washer 84 which allows transferral of force directly from the jaws 16 to the spindle 12 and vice versa. The sleeve 14 is moved the length of the travel distance 88 towards the power end 20 of the spindle 12. The jaws 16 have not moved longitudinally or radially and the jaw faces 40 are still contiguous. Rotating the sleeve 14 in cooperative threaded engagement with the jaws 16 has overcome the "end play" distance.

Figure 4:
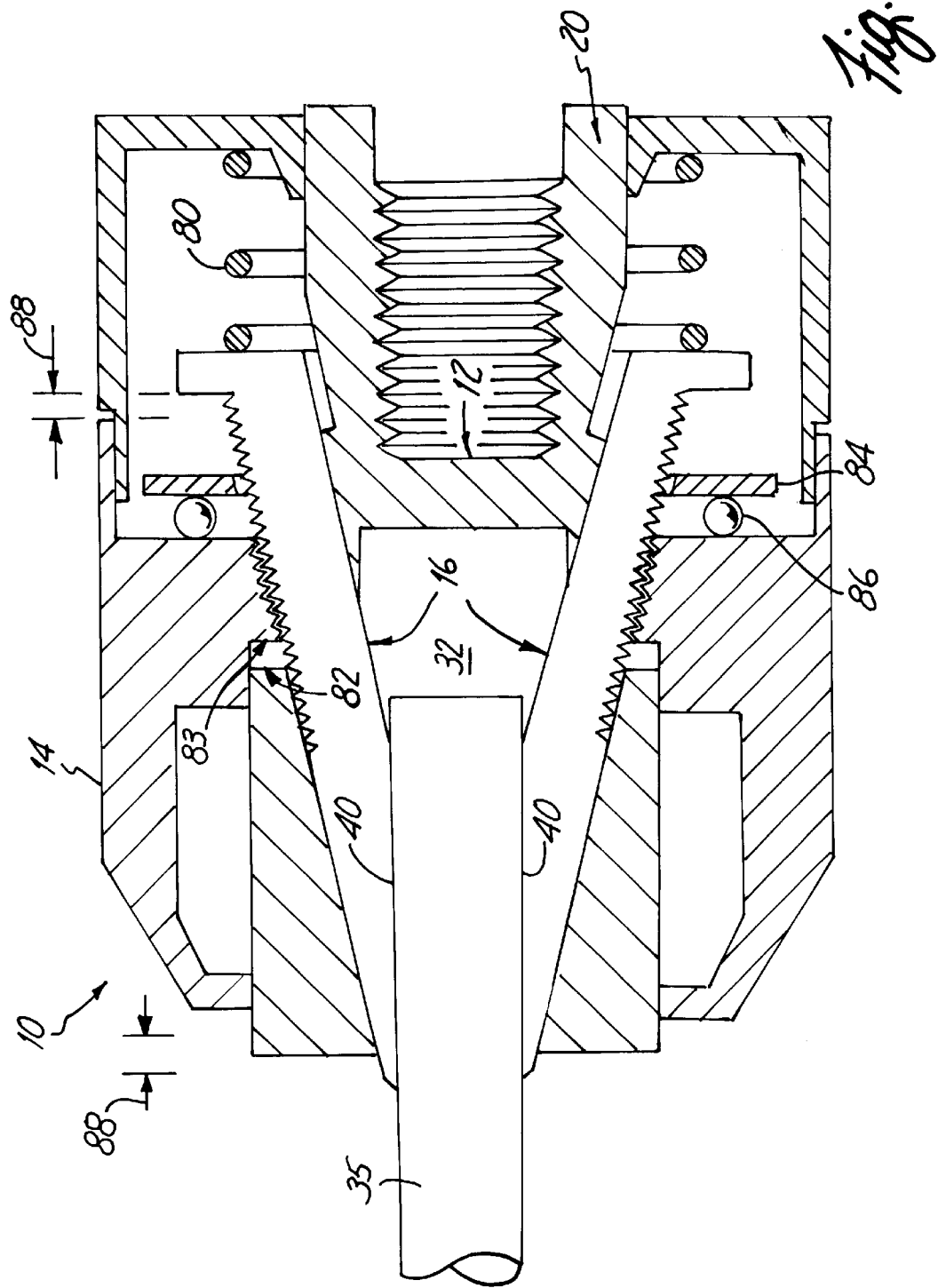
FIG. 4 shows a cross sectional side view of the first embodiment of the invention in the incremental loaded mode.

An example of the inventive chuck 10 with the tool bit 35 clamped between the jaws 16 is shown in FIG. 4. The sleeve 14 has been rotated about the spindle 12 so as to eliminate the end play allowed by the spring 80. The jaws 16 have been "over-tightened" so as to move the sleeve 14 through the longitudinal travel distance 88. The thrust bearing 86 abuts against the thrust washer 84. This allows the user to insert the tool bit 35 and secure it within the chuck 10 regardless of the size of the shank, or whether the bit 35 extends completely into the tool bore 32. Removing the "end play" between the thrust bearing 86 and the thrust washer 84 essentially causes the chuck 10 to operate in the same fashion that a traditional tool chuck would.

Placing the tool bit 35 between the adjustable jaws 16 and rotating the sleeve 14 to "over-tighten" the jaws 16 onto the tool eliminates the end play associated with the quick change mode of the chuck 10. The process of tightening the jaws onto the tool, so that there is no space between the faces 40 of the jaws 16 and the tool has the effect of not allowing the jaws to move longitudinally as the sleeve 14 is "over tightened". Instead, the sleeve is translated so that the thrust bearing 86 is disposed against the thrust washer 84. Thus, any size shaft for the tool bit 35 may be used and locked into place during the incremental mode. In order to remove the tool bit 35 from the chuck 10, the sleeve 14 must be rotated in the opposite direction translating the sleeve 14 towards the hub end 22 of the spindle 12 the travel distance 88 so that the shoulder 82 of the spindle 12 abuts the face 83 of the sleeve 14. Continuing to rotate the sleeve 14 translates the jaws 16 longitudinally along the tool bore 32 towards the power end 20 of the spindle 12, which also retracts the jaws 16 radially away from each other through the spindle 12. The bit 35 can then be axially removed.

FIGS. 1–4 illustrate the use of the chuck 10 in either a quick change or an incremental mode. Sliding the sleeve 14 axially with respect to the spindle 12 puts the chuck 10 in "quick change mode". The jaws 16 are translated an axial distance along the spindle 12 as well as radially withdrawn or inserted into the tool bore 32. This axial distance is defined by a space between the thrust washer 84 and the thrust bearing 86 and maintained by the spring 80. Rotating the sleeve 14 with respect to the spindle 12 puts the chuck in "incremental mode". Since the spring 80 maintains a space between the thrust washer 84 and the thrust bearing 86 providing "end play" to the jaws 16, the chuck 10 must be "overtightened" to force the bearing 86 into contact with the thrust washer 84, thereby eliminating the "end play". Elimination of the end play prevents the standard bit from becoming loose in the bore 32. No other chucks have allowed for this dual mode capability. Thus, the inventive chuck 10 provides an economical and convenient method for utilizing a wide variety of tool bits without the need for specific or different chucks.

Figure 5:
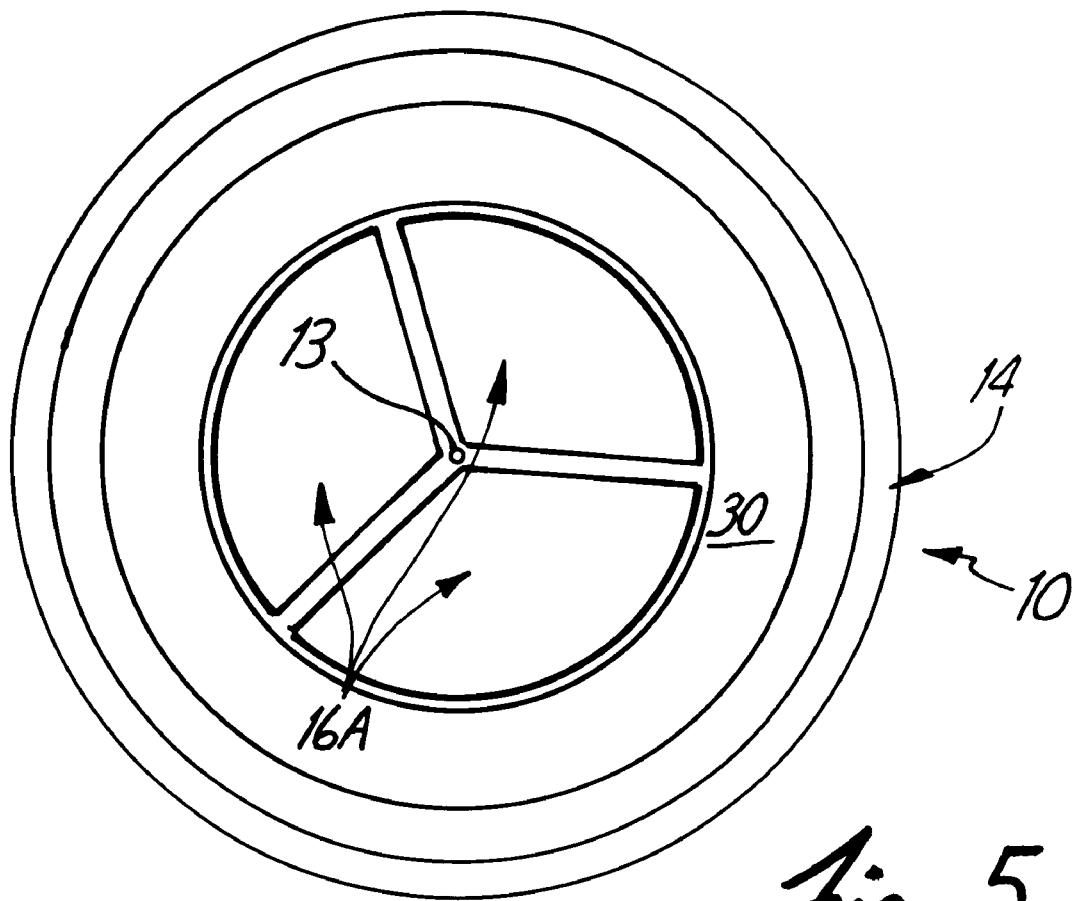
FIG. 5 shows an end view of the inventive chucks of FIGS. 1–4, 6, 7, 7B, 8 and 8A.
Figure 8B:
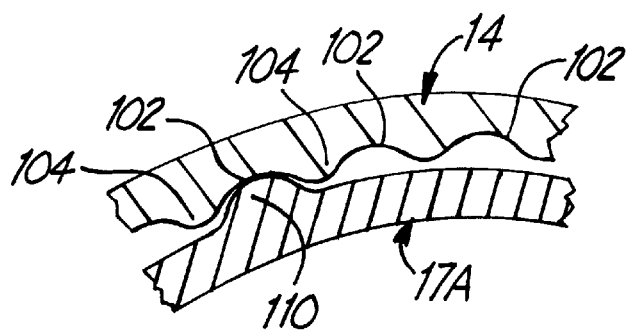
FIG. 8B shows a partial cross-sectional view of the fifth embodiment shown in FIG. 8A as taken along lines 8B—8B.

Although the chuck 10 is depicted in FIGS. 1–4 as utilizing two jaws 16 spaced at 180° from each other, this has been done for illustrative purposes only. The preferred embodiment uses three jaws 16A spaced at 120° intervals around the longitudinal axis 13 of the chuck 10. FIG. 5 shows an end view of the inventive chuck 10 using the preferred jaw 16A configuration as viewed from the forward face 30. This configuration is also the preferred configuration for the alternate embodiments shown in FIGS. 6, 7, 7B, 8 and 8A.

As described earlier, the spring 80 which biases the jaws 16 into the bore 32 may be placed in a variety of areas. A person skilled in the art would realize the spring 80 may be placed anywhere that interfaces with a point fixed relative to the spindle 12 and a point fixed to relative the jaw 16 and sleeve 14 assembly. For example, an alternate embodiment is illustrated in FIG. 6.

In FIG. 6, jaws 16 extend through spindle 12 into tool bore 32. The jaws 16 interface with a sleeve 14 via a gear rack 44 and a sleeve gear 54. Similar to the thrust washer 84 depicted in FIG. 1, a thrust stop and spring support 184 is disposed radially from the spindle 12. The thrust stop and spring support 184 is typically a metal ring press fit into the spindle, although a person skilled in the art would realize it could be integral to the spindle, or manufactured of other materials, including plastic. The thrust stop and spring support 184 has an annular shape which provide two functions in the chuck 10 embodiment. Typically, the jaws 16 extend through the support 184, as illustrated. The thrust stop and spring support 184 acts to limit the range of motion for the sleeve 14, by limiting the distance between the thrust bearing 86 and a bearing face 185 of the thrust stop and spring support 184. A compression spring 180 is positioned between the sleeve 14 and a spring shoulder 186 of the thrust stop and spring support 184. The second function of the thrust stop and spring support 184 is to provide a mounting point for the compression spring 180 so that the sleeve 14 is longitudinally biased towards the hub end 22 of the spindle 12. In this embodiment, the thrust stop and spring support 184 has an inner annulus 192 and an outer annulus 194. The inner annulus 192 projects radially from the spindle 12 and has the bearing face 185 thereon disposed approximately 0.020 inches from the thrust bearing 86. This distance provides the travel distance 88 for the adjustable jaws 16 when the chuck 10 is in the quick-change mode. The outer annulus 194 extends radially outward from the inner annulus 192 to define the spring shoulder 186. When the sleeve 14 is moved by the user in the direction of arrow 56, the spring 180 is compressed against the spring shoulder 186. Additionally, the jaws 16 are radially retracted from tool bore 32. Inner faces 40 of the adjustable jaws 16 are retracted from each other, allowing a tool bit shank (not shown) to be inserted into the tool bore 32. When the user releases the sleeve 14, the spring 180 returns the sleeve 14 to its original position.

The embodiments depicted in FIGS. 1–4 and 6 depict the use of compression springs 80 and 180. Typically these springs are manufactured from spring wire. However, other materials may be used as well, including spring steel washers, elastomers, etc. Additionally, other types of spring mechanisms may be used within the invention, including extension springs, Belleville springs, torsion bars, or power springs. The use of each spring can vary according to the mounting point within the chuck.

An indicator can be included in the inventive chuck to show the correct jaw position for inserting quick-change tool bits, as shown in FIG. 7. The quick-change tool bit 35A is manufactured to have a standard size shank, however, the jaws 16 of the chuck 10 can be disposed so as to accommodate a variety of tool shank sizes. The indicator informs the user of the predetermined jaw position necessary for the quick-change bit 35A to be secured inside the bore 32 when the sleeve 14 is disposed in the "closed position" (towards the hub end 22), while allowing the bit 35A to be released when the sleeve 14 is disposed in the "open" position (towards the power end 20). An example of the need for correct positioning of the jaws 16 is illustrated using a standard ¼ inch quick release tool bit 35A. The jaws 16 are first opened to a predetermined position sized to securely clamp a ¼ inch hex tool shank into the tool bore 32. The user then urges the sleeve 14 towards the power end 20, compressing the spring 80 0.020 inch and retracting the jaws 0.009 inch so as to allow the insertion of the tool bit 35A into the tool bore 32. The shaft of the tool 35A is inserted completely into the bore 32 so as to be disposed against the inner face 34 of the tool bore 32. Next the user releases the sleeve 14 and the spring 80 urges the sleeve 14 and jaws 16 towards the hub end 22 (alternatively, insertion of the tool shank itself in between the jaw faces 40 will press the jaws back to allow insertion). The faces 40 of the jaws 16 extend radially into the tool bore 32, wedging the bit 35A into the bore 32, maintained by the clamping pressure of the spring 80. The jaw faces 40 of each jaw 16 may additionally have surface texture, or a series of small barbs or steps to further enhance the gripping capability of the jaws 16 against tool extraction. To remove the tool bit 35A from the chuck 10, the sleeve 14 is urged towards the power end 20 (against the bias force of spring 80), which radially retracts the jaws 16 from their wedged-locked position.

If the faces 40 of the jaws 16 are initially positioned too close to each other, retracting the jaws 16 0.009 inches will not allow the tool bit 35A to be accommodated in the tool bore 32. Alternatively, if the faces 40 of the jaws 16 are initially positioned too far away from each other, the jaws 16 will not properly wedge the bit 35A into the bore 32, allowing the bit 35A to slide out of the chuck 10. Additionally, the tool bit 35A must abut the inner face 34 of the tool bore 32 in the quick-change mode. If the shank of the bit 35A is not abutting the inner face 34, pressure applied to the bit 35A would force the jaws 16 to compress the spring 80, causing the jaws 16 to retract. The bit 35A would then be free to slide further into the chuck bore 32.

One alternate embodiment of the inventive chuck (FIGS. 7 and 7A) uses a spring biased pawl 100 engaged in grooves 102 (FIG. 7A) against internal teeth 104 (FIG. 7A) disposed longitudinally (axially) on the jaw side 50 of the sleeve 14 to position the jaws 16 in the quick-change mode. The pawl 100 is typically a metal strip having elastic properties and a detent head 101 mounted on one end thereof The other end is fixed to the shroud 17, and the pawl 100 is aligned so that the elastic properties of the strip provide a spring force which retains the detent head 101 in engagement with the grooves 102. The spring force is sufficient to retain a given rotational setting but can be overcome when the sleeve 14 is rotated by the user to adjust the jaws 16. To utilize the quick-change mode, the jaws 16 must be positioned the proper distance from each other. This is accomplished by inserting a quick-change tool bit 35A into the tool bore 32. The sleeve 14 is rotated so as to extend the jaws 16 radially into the tool bore 32 and clamp the bit 35A snugly without "over-tightening." The sleeve 14 is then rotated in the reverse direction "one-click" of the pawl 100. This setting is retained to insert and remove quick-change tools.

Figure 7A:
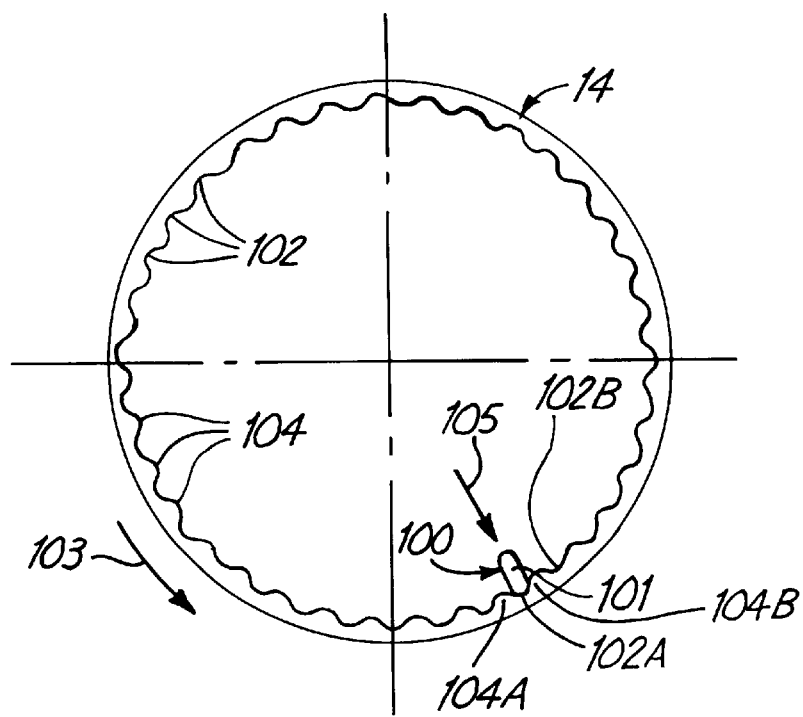
FIG. 7A shows a cross-sectional view of the teeth and groove configuration of the sleeve of FIG. 7 as taken along lines 7A—7A in FIG. 7 (with some components removed for clarity).

A cross-sectional view of the sleeve 14 is shown in FIG. 7A to illustrate the grooves 102 and teeth 104 disposed in the sleeve 14. When the sleeve 14 is rotated as described above to tighten the jaws 16 together (in direction of arrow 103), the pawl 100 clicks into a first groove 102A. The detent head 101 of the pawl 100 is biased radially outwardly (as shown by arrow 105 in FIG. 7A) and thus prevents the sleeve 14 from turning (without the user's assistance) by a first tooth 104A and a second tooth 104B disposed on opposing sides of the first groove 102A. The sleeve 14 is then reversed "one-click" (rotated in direction 106 relative to the pawl 100, see FIG. 7A) by the user which pushes the detent head 101 of the pawl 100 into a second groove 102B. The distance between the first groove 102A and the second groove 102B is such that the jaws 16 (shown in FIG. 7) are positioned within the bore 32 so as to allow the user to operate the chuck 10 in quick-change mode.

In an alternate embodiment of the inventive chuck shown in FIG. 7B, a release button 106 is disposed through the shroud 17 so as to engage the pawl 100. Depressing the release button 106 overcomes the spring bias on the pawl 100 and pushes the detent head 101 of the pawl 100 out of engagement with the grooves 102 and teeth 104 in the sleeve 14. This allows free rotation of the sleeve 14 during adjustment. Also, a stronger pawl bias spring can be used, since manual operation of the button 106 is able to directly counter the spring force of the pawl 100.

Another embodiment of the inventive chuck utilizes a slidable shroud 17A with one or more mating lugs 110, as shown in FIG. 8. The shroud 17A is allowed to move a limited distance longitudinally (axially) along the power end 20 of the spindle 12. The shroud 17A is allowed to slide relative to the spindle 12 using a tongue and groove connection thereto or by other connective methods commonly known in the art.

The mating lug 110 is disposed on a forward end 112 of the shroud. The invention is illustrated in FIG. 8 with the shroud 17A disposed in the most rearward position (to the right). In the rearward position, the lugs 110 do not engage the grooves 102 and teeth 104 of the sleeve 14 (shown in FIG. 7A). The sleeve 14 is allowed to rotate freely, and the chuck 10 can be operated in the "incremental" mode.

To operate the chuck 10 in the "quick-change" mode, a quick-change tool bit 3 5A is inserted into the chuck 10 and the sleeve 14 is rotated to move the jaws 16 in contact with the shank of the tool 35A. The operator then moves the shroud 17A forward (to the left), as shown by arrow 114 in FIG. 8A, until the lug 110 from the shroud 17A rests in one of the grooves 102 of the sleeve 14. The teeth 104 (best shown in FIG. 7A) on the sleeve 14 engage the lug 1 10, and prevent the sleeve 14 from rotating (see FIG. 8B). Thus, the sleeve is "locked" in place at the position needed to operate the chuck 10 in the "quick-change" mode. Although only one lug 110 is shown, a plurality may be provided. Further, although three alternatives have been described to lock the chuck 10 into "quick-change" mode, a person skilled in the art would realize other alternatives exist which would allow the user to secure the sleeve 14 in position, such as a visual indicator (i.e., a mark).

Although the present invention has been described with reference to preferred embodiments, workers skilled in the art will recognize that changes may be made in form and detail without departing from the spirit and scope of the invention.

What is claimed is:

1. A chuck for a tool bit, mounted to a drive shaft, comprising:
   a spindle including,
      a power end of the spindle
      a hub end of the spindle,
      a forward face disposed on the hub end,
      an axial bore extending into the hub end from the forward face, the bore having an inner end for receiving a shank of the tool bit,
   a thrust washer, fixed relative to the spindle;
   a sleeve disposed around and rotatably connected to the hub end, the sleeve having a spindle sidewall and an outer sidewall where a space exists between the sleeve and the thrust washer;

adjustable jaws protruding through the spindle radially into the bore at an acute angle and defining an opening between the jaws, whereby the jaws threadably engage the sleeve, so that rotating the sleeve about the hub causes the adjustable jaws to translate between an open position and a closed position, the open position occurring when the jaws are retracted from the bore and the closed position occurring when the jaws are extended into the bore; and an elastic member acting to bias the jaws toward the closed position and maintaining the space between the thrust washer and the sleeve wherein overcoming the spring force of the elastic member eliminates the space between the thrust washer and the sleeve.

2. The chuck of claim 1, and further comprising:

a sleeve gear disposed on the spindle sidewall of the sleeve;

a jaw gear rack disposed on each jaw which threadably engages the sleeve gear;

wherein rotating the sleeve with respect to the spindle translates into axial movement of the jaws between an open and closed position;

wherein continuing to rotate the sleeve after the jaws have reached the closed position eliminates the space between the thrust washer and the sleeve.

3. The chuck of claim 1, and further comprising:

an indicator assembly for locking the adjustable jaws into quick-change mode.

4. The chuck of claim 1 wherein the thrust washer is integral to the spindle.

5. The chuck of claim 1, and further comprising:

a thrust bearing disposed in the space between the thrust washer and the sleeve.

6. The chuck of claim 1, further comprising:

a mechanism for selectively fixing the rotational position of the sleeve relative to the spindle.

7. The chuck of claim 6 wherein the mechanism includes:

a sleeve locking member having a first end fixed relative to the spindle and a second free end; and a section on the sleeve adapted to accept the free end of the locking member, wherein the engagement of the free end in the section prevents free rotation of the sleeve relative to the spindle.

8. The chuck of claim 1, and further comprising:

a manual release for disengaging the free end of the locking member from the section to permit free rotation of the sleeve relative to the spindle.

9. The chuck of claim 1 wherein the elastic member is a compression spring.

10. A chuck for a tool bit comprising:

a spindle having a central axis with
a hub end at one end thereof,
a power end as the other end thereof, and
an internal axial bore for receiving a tool bit;

a plurality of opposed jaws extending radially through the spindle and into tile bore for griping the tool bit;

a sleeve threadably engaged with the jaws so that rotation of the sleeve relative to tile spindle moves the jaws axially and radially relative to the bore between an open position and a closed position;

a bias member aligned between the spindle and the jaws to urge the jaws toward the hub end of the spindle and radially into the bore; and axially opposed and spaced apart surfaces on the spindle and sleeve which are biased apart by the bias member, wherein continuing to rotate the sleeve after the jaws have reached the closed position eliminates the space between the axially opposed and spaced apart surfaces.

11. In a method for removing a tool bit from a chuck wherein the chuck has a plurality of jaws disposed radially about the tool bit for gripping thereof, a sleeve threadably engaged with the jaws and a spindle for supporting the jaws and sleeve, the improvement which comprises:

providing opposed limit surfaces between the spindle and sleeve which allow relative movement therebetween from a first spaced position to a second closed position;

biasing the opposed limit surfaces into the first spaced position;

urging the sleeve toward the spindle to overcome the biasing apart thereof until the limit surfaces are in the second closed position whereby the jaws move axially and radially relative to the spindle sufficienitly to permit withdrawal of the tool bit therefrom.

12. The chuck of claim 10, wherein translating the sleeve axially relative to the bore so as to move the jaws towards the open position translates the axially opposed and spaced apart surfaces towards each other.

13. The chuck of claim 10, and further comprising:

an indicator assembly for selecting the rotational position of the sleeve relative to the spindle.

14. The chuck of claim 10 wherein the axially opposed and space apart surfaces further comprise:

a radially extending thrust washer fixably attached to the spindle; and a radially extending thrust side surface of the sleeve.

15. The chuck of claim 10, and further comprising:

a thrust bearing disposed between the axially opposed and spaced apart surfaces.

16. The chuck of claim 10, further comprising:

a mechanism for selectively fixing the rotational position of the sleeve relative to the spindle.

17. The chuck of claim 16 wherein the mechanism includes:

a sleeve locking member having a first end fixed relative to the spindle and a second free end; and a section on the sleeve adapted to accept the free end of the locking member, wherein the engagement of the free end in the section prevents free rotation of the sleeve relative to the spindle.

18. The chuck of claim 10 wherein the elastic member is a compression spring.

19. The method of claim 11 and further comprising:

selectively locking the rotational position of the sleeve with respect to the spindle.

20. The method of claim 19 wherein selectively locking the rotational position of the sleeve further comprises:

a sleeve locking member having a first end fixed relative to the spindle and a second free end; and a section on the sleeve adapted to accept the free end of the locking member, wherein the engagement of the free end in the section prevents free rotation of the sleeve relative to the spindle.

* * * * *